(12) United States Patent
Van Der Leest et al.

(10) Patent No.: US 9,396,357 B2
(45) Date of Patent: Jul. 19, 2016

(54) PHYSICALLY UNCLONABLE FUNCTION (PUF) WITH IMPROVED ERROR CORRECTION

(71) Applicant: INTRINSIC ID B.V., Eindhoven (NL)

(72) Inventors: Vincent Van Der Leest, 's-Hertogenbosch (NL); Bart Karel Benedikt Preneel, Leuven (BE); Erik Van Der Sluis, Utrecht (NL)

(73) Assignee: INTRISIC ID B.V., Eindhoven (NL)

( * ) Notice: Subject to any disclaimer, the term of this patent is extended or adjusted under 35 U.S.C. 154(b) by 59 days.

(21) Appl. No.: 14/360,519

(22) PCT Filed: Nov. 23, 2012

(86) PCT No.: PCT/EP2012/073440
§ 371 (c)(1),
(2) Date: May 23, 2014

(87) PCT Pub. No.: WO2013/083415
PCT Pub. Date: Jun. 13, 2013

(65) Prior Publication Data
US 2014/0325237 A1    Oct. 30, 2014

(30) Foreign Application Priority Data

Dec. 6, 2011    (EP) .................................... 11192050

(51) Int. Cl.
*G06F 21/72*    (2013.01)
*H04L 9/08*    (2006.01)

(52) U.S. Cl.
CPC .............. *G06F 21/72* (2013.01); *H04L 9/0866* (2013.01)

(58) Field of Classification Search
CPC ............................... G06F 21/72; H04L 9/0866
USPC ......................................................... 713/189
See application file for complete search history.

(56) References Cited

U.S. PATENT DOCUMENTS

2008/0256600 A1*  10/2008  Schrijen et al. ................... 726/2
2010/0177898 A1*  7/2010   Tuyls et al. ..................... 380/270
2012/0072737 A1*  3/2012   Schrijen et al. ............... 713/189

FOREIGN PATENT DOCUMENTS

WO    WO 2009/024913    2/2009

OTHER PUBLICATIONS

International Search Report for PCT/EP2012/073440, mailed Jul. 3, 2013.

(Continued)

*Primary Examiner* — Jung Kim
*Assistant Examiner* — Thomas Ho
(74) *Attorney, Agent, or Firm* — Nixon & Vanderhye PC

(57) ABSTRACT

A cryptographic system for reproducibly establishing a reliable data string, such as a cryptographic key, from a noisy physically unclonable function (PUF, 110) is provided. The system comprises a hard decision decoder (150) to decode a first multiple of error correctable data words to obtain a second multiple of corrected and decoded data words and a reliability information extractor (180) to determine reliability information, e.g. soft decision information, that is indicative of a reliability of corrected and decoded data words. The system further comprises a soft decision decoder (160) configured to use the reliability information to decode at least one further correctable data word. Error correcting a PUF using reliability information decreases the false rejection rate.

14 Claims, 8 Drawing Sheets

(56) References Cited

OTHER PUBLICATIONS

Written Opinion of the International Searching Authority for PCT/EP2012/073440, filed Jul. 3, 2013.

Yu, M-D et al., "Secure and Robust Error Correction for Physical Unclonable Functions", IEEE Design & Test of Computers, vol. 26, No. 1, (Jan. 1, 2010), pp. 48-65.

Van Der Leest, V. et al., "Soft Decision Error Correction for Compact Memory-Based PUFs Using a Single Enrollment", Cryptographic Hardware and Embedded Systems CHES 2012, (Sep. 9, 2012), pp. 268-282.

Verbauwhede, I. et al., "A soft decision helper data algorithm for SRAM PUFs", Information Theory, (Jun. 28, 2009), pp. 2101-2105.

* cited by examiner

PHYSICALLY UNCLONABLE FUNCTION (PUF) WITH IMPROVED ERROR CORRECTION

This application is the U.S. national phase of International Application No. PCT/EP2012/073440, filed 23 Nov. 2012, which designated the U.S. and claims priority to EP Application No. 11192050.0, filed 6 Dec. 2011, the entire contents of each of which are hereby incorporated by reference.

FIELD OF THE INVENTION

The invention relates to a cryptographic system for reproducibly establishing a reliable data string from a noisy physically unclonable function (PUF), the physically unclonable function being configured for establishing an initial data string depending at least in part upon partially random physical characteristics of the physically unclonable function, the system comprising a normalizer configured for determining a first multiple of error correctable data words on the basis of the initial data string, and a hard decision decoder configured to decode the first multiple of error correctable data words to obtain a second multiple of corrected and decoded data words.

The invention further relates to cryptographic method for reproducibly establishing a reliable data string from a noisy physically unclonable function. The invention also relates to a corresponding computer program.

BACKGROUND OF THE INVENTION

A physical unclonable function (PUF) establishes a data string, such as the initial data string, which depends upon partially random physical characteristics of the physically unclonable function. The physical characteristics are caused by variations during the manufacturing of the PUF. A PUF is relatively easy to make as process variations are unavoidable, but reproducing the natural variations, and thus duplicating the PUF is very hard, if not impossible. A PUF thus provides intrinsic protection against cloning.

On the other hand the contents of a PUF cannot be predetermined, and PUF responses are somewhat noisy.

Physical unclonable functions have proven to be advantageous alternatives for many forms of secure identification, including the storing of keys, identifiers and the like in secure memories.

The data string may depend on a stable state in which a configuration of components of the PUF settles upon the component's power-up. The particular stable state into which the configuration settles dependent at least in part upon at least partially random physical characteristics of the particular components. An example of a PUF is a volatile memory which shows a power-up contents which depends on the partially random physical characteristics of the memory. Manufacturing variations lead to different physical characteristics for different memories.

This property of PUFs makes them suitable for a range of applications. For example, PUFs may be used to combat counterfeiting. As a further example, PUFs are used to create cryptographic keys. Using a PUF the need for secure memory to store a key is circumvented. A PUF furthermore provides natural protection against unauthorized attempts to obtain the cryptographic key through physical reverse engineering (also known as tampering), since damage inflicted on the PUF during the attempt would change the initial data string beyond repair.

PUFs have been advantageously applied in electronic devices. Even tiny manufacturing variations which are unavoidable during manufacture of an IC lead to different properties of the IC. These different properties are normally suppressed, in an effort to obtain a batch of ICs that operate in the same manner. However, to create a PUF the differences among individual ICs in a batch of ICs are exploited.

Since the behavior of a PUF depends on small variations, a certain error percentage is unavoidable. An error correction procedure can be used to correct for these fluctuations, and make sure that the reliable data string is identical, each time it is derived from the PUF. Using so-called helper data the initial data string is mapped to one or more error correctable data words. An error correctable data word is a data word which is close to a code word of an error correcting code. An error correctable data word may be seen as the sum of a code word and an error word. By applying an error correcting algorithm corresponding to the error correcting code, the error correctable data words are decoded into corrected and decoded data words. Possibly the code words close to the error correctable data words are computed as an intermediate step.

SUMMARY OF THE INVENTION

A problem of existing physically unclonable function is their potential high error rate. To cope with extreme external variations such as temperature and applied voltage, the system should be able to cope with an error rate of up to 25%. That is 25% of the bits in the initial bit string may differ between subsequent read-outs of the PUF. Accordingly, there is a need for powerful error correcting codes capable of correcting a data string with a high error rate. On the other hand, there is a wish to use PUFs in systems with reduced resources, e.g. limited computing capabilities, such as smart cards. This rules out the use of the error correcting codes used in different fields, such as telecommunications systems.

The cryptographic system according to the invention is configured for reproducibly establishing a reliable data string from a noisy physically unclonable function (PUF). The physically unclonable function is configured for establishing an initial data string depending at least in part upon partially random physical characteristics of the physically unclonable function. For example, the initial data string may depend on a physical, at least partially random, configuration of components, or from variations in doping levels.

The cryptographic system comprises a normalizer configured for determining a first multiple of error correctable data words on the basis of the initial data string, a hard decision decoder configured to decode the first multiple of error correctable data words to obtain a second multiple of corrected and decoded data words, a reliability information extractor configured to determine reliability information that is indicative of a reliability of said decoding of the first multiple of error correctable data words, a data arranger configured to arrange the second multiple of corrected and decoded data words to obtain at least one further correctable data word, and a soft decision decoder configured to decode the at least one further correctable data word using the reliability information to obtain at least one further corrected and decoded data word, the reliable data string being obtained from the at least one further corrected and decoded data word.

The cryptographic system extracts a reliable data string, such as a cryptographic key, from a physical unclonable function that is based on soft-decision error decoding. The extracted data string has a high reliability because it is error corrected through a combination of two (or more) codes.

During the first decoding, by the hard decision decoder, a reduction in the amount of information takes place. In a sense the amount of information contained in second multiple of corrected and decoded data words is less than in the initial bit string. By extracting information regarding the reliability of the decoding of the first multiple of error correctable data words, some of the lost information is recovered. That is the reliability information together with the second multiple of corrected and decoded data words carry more information than the second multiple alone. A soft decision decoder can exploit the reliability information to obtain a more reliable decoding than a second hard decoder can.

Directly obtaining soft data for a PUF is impossible or problematic for many types of PUFs. For example, for a PUF based on the power-up content in a volatile memory, obtaining soft data for the content would involve repeated power cycles, i.e., sequential power down and power up, to obtain multiple readings of the memory. To allow measuring multiple PUF responses with power cycles in between, the readout and processing part of the PUF need to be in different power domains. Having multiple power domains is known to be problematic. Care is needed to avoid leakage between the power domains; Extra chip area is required to include isolation cells and power routing. This also requires extra design effort (in terms of layout, netlist generation, synthesis and layout). The PUF according to the invention generates soft data without the need for multiple power cycles. One PUF response suffices for generating soft data values. A soft data value is generated which indicates the collective reliability of part of the PUF, based on the result of a hard decoder. Note that, using a non-volatile memory to keep intermediate data across power cycles would decrease security, in fact often a PUF is used as an alternative to secure storage.

In an embodiment, the physically unclonable function and the normalizer are in a same power domain. In a refined embodiment, the hard decision decoder is also in the same power domain. In a yet further refined embodiment, the reliability information extractor, the data arranger and the soft decision decoder are also in the same power domain.

Two components may be in the same power domain by connecting them to the same power line. For example, the system may be implemented in CMOS technology, say with the PUF as an SRAM, and the normalizer may be implemented as hardware or as software running on a processor. The normalizer (hardware or processor) and the PUF (say the SRAM) may be in the same power domain. Two components that are in the same power domain are necessarily powered-down and powered-up together.

The invention does not need repeated measurements of PUF responses to determine reliability data.

Alternatively, the physically unclonable function is in a separate power domain. For example, the physically unclonable function and the normalizer may be in different power domains. In a refined embodiment, the hard decision decoder is also in the different power domain. In case the physically unclonable function is in a separate power domain, soft decision data could be obtained by obtaining multiple readings of the PUF in multiple power cycles, say, followed by averaging over the multiple readings. However, it is advantageous to apply the invention even in this case. Power cycles take a comparatively long time. SRAM memory often needs to be powered off in the order of 1 second in between of the measurements to guarantee a good PUF readout at low temperatures (because of data remanence effects). For a consumer application this would be unacceptably long. Furthermore, using multiple readings requires more buffer space. Even if power domains are not used to obtain multiple readings of the PUF, they may still be used for other purposes. For example, having a PUF, e.g., an SRAM, in a separate power domain minimizes aging of the memory since the memory can be turned off after the PUF has been used to get a response. Furthermore, multiple reading may be required if the PUF is used in a random number generator.

The soft decision decoder also increases the efficiency obtaining a reliable data string from a PUF. Some PUFs may be naturally adapted to give soft decision information regarding the reliability of the initial string. For example, in an advantageous system for reproducibly establishing a reliable data string from a noisy physically unclonable function (PUF), the system comprises a normalizer configured for determining an error correctable data word on the basis of the initial data string, a reliability information extractor configured to determine reliability information that is indicative of a reliability of the initial data string, and a soft decision decoder configured to decode the error correctable data word using the reliability information to obtain a corrected and decoded data word, the reliable data string being obtained from the corrected and decoded data word.

In the above advantageous system, the physically unclonable function could depend on timing or counting a physical process. For example the physically unclonable function may comprise an oscillator, or a delay circuit. The initial data string may be obtained by comparing the physical process to a threshold. The reliability information may be obtained by classifying the distance to the threshold.

However, not all PUFs are readily adapted to give reliability information regarding their output. In particular, if existing integrated circuit elements are used as a PUF, then one typically only has quantified output, e.g. binary data. For example, if a memory element, say SRAM, Flip-flop, buskeeper, or butterfly PUF is used no information is readily available that indicates how close to the threshold for a 1 or 0 the respective elements were. It was a further insight of the inventor how the use of reliability information could be combined with such a PUF. By inserting an additional code between the soft decision decoder and the normalizer, at least reliability information may be obtained on the level of decoded data words. Although reliability information is averaged over the decoded data words, the amount of information for use in the subsequent soft decision decoder has increased, thus improving the decoding and ultimately the reliability of the data string.

A Physical Unclonable Function (PUF) is a function that is realized by a physical system, such that the function is easy to make but the physical system is hard to characterize and hard to clone. Since a PUF cannot be copied or modeled, a device equipped with a PUF becomes unclonable. Physical systems that are produced by an uncontrolled production process (i.e. that contains some randomness) turn out to be good candidates for PUFs.

A PUF may, but need not, take an input, also referred to as a challenge. Many practical PUF are so-called single-challenge inputs. They effectively operate as a digital identifier. More advanced PUFs take an input. Such a multi-challenge PUF is designed to interact in a complicated way with the challenge, i.e. stimuli and leads to unpredictable responses, for each challenge. The invention may be used both with single and multi challenge PUFs. Even single-challenge PUFs increase security of a system, especially for secrets which need not be known outside of the device that comprises the PUF. For example, a key that is used for secure storage, memory encryption etc, boot-up protection etc, need not necessarily be known outside the device.

Combinations of error correcting codes that do not use soft decision decoding require a large initial data string, for example, by using a PUF having a large SRAM, in order to derive the reliable data string, e.g. a certain cryptographic key, with a reasonable false rejection rate. A lot of information is lost because decoding the first error correcting code results only in few information bits per codeword. The false rejection rate (FRR) is the probability that due to errors in the measured PUF response, the reliable data string cannot be reconstructed. A low FRR is desirable.

The invention thus gives an advantageous method of extracting an identifier or key from a physical unclonable function using a soft-decision error correcting algorithm. The soft-decision information, also known as certainty or reliability information, may be derived from the difference between an input (noisy) codeword and its error corrected output of a previous decoding step.

A PUF is typically 'unreliable' in the sense that two readouts of the same PUF will almost never give the same initial bit string. The reliable data string is the same after almost every reconstruction of the reliable data string. The level of reliability depends on the application of the invention. For civilian use, e.g., in access control, financial control etc a larger FRR will be acceptable than, e.g., in military use. FRR may be reduced by using codes that can correct a larger number of errors.

Preferably, the reliable data string, e.g. bit string, is unique for the electronic device wherein the physical unclonable function is embedded. Although not strictly needed, this makes identification more reliable and keys more secure. In an embodiment, the cryptographic system comprises a key establisher for establishing a cryptographic key by applying a key derivation algorithm to the reliable data string.

In an embodiment, the initial data string may depend on a physical, at least partially random, configuration of components. In an embodiment, the PUF comprises any of an SRAM, a flip-flop, a bus-keeper, a butter-fly PUF for deriving the initial bit string.

Typically, the PUF comprises multiple volatile memory elements that settle in a state upon power-up that depends on the physical characteristics of the memory element. Typically the initial bit string is obtained in a digital form, say, as a sequence of bits.

The SRAM PUF is a known PUF which is based on a standard available component, namely SRAM. SRAM or Static Random Access Memory is a standard component that is used in most devices (e.g. ASICs, microprocessors, DSPs, ASSPs, etc.) today. It comprises two cross-coupled inverters and two additional transistors for external connection, hence six transistors in total. It is widely used due to its speed for short term data storage. When a voltage is applied to a memory cell, it chooses its logical preference state: the logical 1-state or the logical 0-state. Each cell has a unique preference state, which is determined by the threshold voltages of the transistors that make up the two cross-coupled invertors. The threshold voltages of different transistors are slightly different because of uncontrollable process variations during manufacturing. The string determined by all the preference start-up values of the memory cells of an SRAM memory array forms a random identifier that identifies the SRAM memory uniquely. This identifier is the PUF response, i.e. the initial data string. This phenomenon has been verified in many experiments and on many SRAM types.

Another memory-based PUF is the so-called Flip-flop PUF. This PUF uses the startup value of flip-flops or registers. Flip-flop, bus-keeper and register PUFs are described in an EP patent application of the same applicant, with title 'PHYSICAL UNCLONABLE FUNCTION', application number EP10192352.2, filed on 24 Nov. 2010.

In an embodiment, the normalizer determining the first multiple of error correctable data words comprises combining the initial data string with so-called helper data.

For example, the initial bit string and the helper data may be both represented as a digital value, the helper data mapping the initial bit string to a neighborhood of one or a multiple of correctable code words. For example, the helper data may be added to the initial bit string. For example, the initial bit string and the helper data may be combined by using an XOR operation. The helper data may also be concatenated to the initial bit string, for example in case the helper data represents redundancy information.

In information theory, both a hard- and a soft-decision decoder decode data that has been encoded with an error correcting code. The difference between a hard- and a soft-decision decoder relates to the use of reliability information. A hard-decision decoder is an error correcting decoder that takes as input a fixed set of possible values (typically 0 or 1 in a binary code). A hard decision decoder does not take as input reliability information. A soft-decision decoder takes has input extra information indicating the reliability of each input data point, and is used to form better estimates of the original data. A soft-decision decoder will typically perform better in the presence of corrupted data than its hard-decision counterpart.

Different error correction codes can be used in the system. It is also possible to use the same error correcting code twice, once with a hard decision decoder and once with a soft decision decoder. It is also possible to have a two or multi-stage approach with two or more, possibly different, soft decision error correcting decoders after the hard decision decoder. Combining error correcting codes in a multi-stage approach leads to more efficient solutions in terms of the amount of PUF data that is needed in order to extract a key of a certain length, having the same FRR.

In an embodiment, the hard decision decoder is configured to decode each error correctable data word of the first multiple of error correctable data words to obtain a corresponding corrected and decoded data word of the second multiple. For example, one way to convert the initial string is to XOR helper data to the initial data string. The resulting string is partitioned into error correctable data words.

Since the error rate of a PUF can be high, it is particularly advantageous if the first code (used in the hard decision decoder) has a relatively low code rate (also known or information rate), which is capable of correcting a relatively large number of errors. Experiments have confirmed this. In an embodiment, the hard decision decoder is configured for decoding a repetition code. In an embodiment, the hard decision decoder is configured for decoding a Hadamard code. In an embodiment the hard decision decoder and/or the soft decision decoder use linear codes, preferably, binary codes.

Since low code rate codes tend to have relatively few code words, list decoding is a good option for use in the hard decision decoder.

Reliability information is also known as certainty information, or as soft-decision information.

In an embodiment, reliability information is derived from the difference between an error-corrected codeword and the noisy codeword before error correction (part of the first multiple). A noisy codeword is also referred to as an error correctable data word, it is a code word having a number of errors. The number of bits that are changed to go from the noisy code word to the corrected code word is an indication of the reliability of the corrected code word. The more bits are changed the higher the chance that the codeword is wrong, the lower the reliability.

This soft-decision information is used as input for a consecutive soft-decision error correction module or algorithm. Using this soft-decision information enables the use of more efficient fuzzy extractors that require less PUF input to derive a key of a certain length.

Using this construction for the first decoder, the second decoder will have more information about the input (it will know more about the hardware of the input) and can therefore reconstruct the required codeword with a lower FRR than in the previously known schemes.

In an embodiment, the reliability information comprises a reliability value that is indicative of the reliability of the decoding of a particular error correctable data word of the first multiple of error correctable data words into a particular corrected and decoded data word of the second multiple of corrected and decoded data words.

Correcting the particular error correctable data word gives a corresponding code word, either directly or by encoding the resulting data word. By comparing the error correctable data word with the corresponding code word, an indication is obtained of the reliability of the decoding.

When a PUF is read out, the number of errors in any particular code word may be higher than the number of correctable errors. In that situation the hard decision decoder still gives a corrected and decoded data word, but not the correct data word. In that situation it is more likely that the difference between the noisy codeword and the corresponding code word is large than that it is small. Although it is possible that so many errors occurred that the code word has changed almost completely into a different code word, it is much more likely that the code word went just beyond the error correction limit. Accordingly, the difference between the noisy codeword and the corresponding codeword is a good indication of the reliability of the decoding.

In an embodiment, the reliability information extractor comprises a distance determiner for determining a distance between a particular codeword corresponding to the particular corrected and decoded data word and the particular error correctable data word, the reliability value being derived from the distance.

The difference between a codeword after error correction and the noisy codeword before error correction may be computed as the hamming distance. The higher the distance the lower the reliability is.

A simplest form of quantization that would work is using the hamming weight of the sequence of bits directly, if the hard decision decoder uses a repetition code. For other codes, the hamming weight of the difference (say xor difference) between the correctable code word and the corrected code word may be used. Different threshold values can be used in the quantizer. For example, the hamming weight space could be divided into equal parts. Alternatively the used thresholds can be optimized for a given second decoder, e.g. by simulating with different thresholds and choosing the optimal values. For example, one could count the number of zero's in the XOR sum of a noisy codeword and the corresponding codeword to get a reliability value (wherein higher, i.e. more zeros, is more reliable).

The reliability information may be quantized into a limited set of discrete levels. Even the number of discrete levels may be lower than the length of a code word. For example, 3 bits may be used to represent 8 levels of reliability, even if the code used by the hard decision decoder is longer.

In an embodiment, all bits of a decoded word of the hard decision decoder are assigned the same reliability information. In an embodiment, the reliability value is a rational number.

In an embodiment, the hard decision decoder is configured to decode each error correctable data word of the first multiple of error correctable data words to obtain a corresponding corrected and decoded data word of the second multiple, and wherein the reliability information extractor is configured to determine a reliability value for each one of the second multiple of corrected and decoded data words that is indicative of the reliability of the corresponding decoding of the error correctable data words of the first multiple.

The data arranger takes the decoded data words in the second multiple and assembles them into new error correctable code words. In an embodiment, the data arranger assigns the reliability value of a decoded data word to all of the bits in the decoded data word. Ails bits in the same decoded data word thus receive the same reliability value. In an embodiment, the data arranger permutes the collected bits in the second multiple into one or further error correctable data words. The bits in the further error correctable data words have assigned to them a reliability value that is obtained from the data word in the second multiple from which the bit was obtained.

In an embodiment, the data arranger is configured to arrange at least part of a first corrected and decoded data word of the second multiple and at least part of a second corrected and decoded data word of the second multiple into the same at least one further correctable data word.

In an embodiment a first part of a certain data word of the second multiple is used in a first further error correctable data word of the at least one further correctable data words, and a second part of the certain data word is used in a second further error correctable data word of the at least one further correctable data word.

This has the advantage that if the certain data word, is wrong it is distributed over multiple correctable data words thus decreasing the FRR. In an embodiment, the data arranger is an interleaver.

In an embodiment, the data arranger is configured to assign a different reliability value to different parts of the at least one further corrected and decoded data word. For example, the at least one further correctable data word comprises multiple bits, each bit of the multiple bits being obtained by the data arranger from a corresponding corrected and decoded data word of the second multiple of corrected and decoded data words. In an embodiment, each bit of the multiple bits is assigned a reliability value.

In a further embodiment, each bit of the multiple bits is obtained by the data arranger from a corresponding corrected and decoded data word of the second multiple of corrected and decoded data words. The data arranger may be configured to arrange reliability information in conjunction with the second multiple of corrected and decoded data words to obtain a reliability value for each bit of the multiple bits. A reliability value assigned to a bit of the multiple bits being the reliability value of a corresponding corrected and decoded data word.

In case codes are combined and/or concatenated, interleaving can be used between the codes, meaning that the output information bits after decoding of a first code are distributed over multiple different (noisy) code words of a second code. This way the impact of an incorrect decoding by the first decoder is spread over the different code words that are used at the input of the second decoder. This increases the probability of correctly decoding, e.g., of a cryptographic key.

Note that this is not necessary if the first code is a repetition code since the number of secret bits per codeword is 1.

In an embodiment, the soft decision decoder uses maximum likelihood decoding to determine the most likely codeword given the input quantization values. Maximum likelihood decoding gives decoding of a high quality but may be resource intensive. In an embodiment the soft decision decoder is configured for decoding a BCH code or a Golay code.

In an embodiment, the system comprises a further soft decision decoder. The further soft decision decoder configured to decode at least one yet further correctable data word using further reliability information indicative of a reliability of said decoding of the at least one further correctable data word.

Using three or more codes is based on a surprising insight of the inventor. Having more than 2 codes allows each of the used codes to be relatively weak, i.e. capable of correcting relatively few errors. The net resource used for three codes turns out to be lower than using 2 codes of comparable strength. Thus in an embodiment, at least two soft-decision decoders are used.

When using a third code, we will refer to the further soft decision decoder as the second soft decision decoder and the soft decision decoder as the first soft decision decoder. The first soft decision decoder could have a "soft" output value that is to be used as input for the second soft decision decoder. One could for instance use a possibly quantized version of, the Euclidean Distance between the input- and decoded codeword of the first soft decision decoder to provide information about the likelihood of the output of the decoder. In this way the second soft decision decoder will have more information about each of its input bits and is hence more capable of decoding the correct information bits that were used during encoding.

The cryptographic system may be an electronic cryptographic system, e.g., comprised in a mobile electronic device, mobile phone, set-top box, computer, smart card, and the like.

In an embodiment, the cryptographic system is configured to iteratively decode, e.g. using turbo decoding. For example, a third decoder, namely a further soft decision decoder may be added. The further soft decision decoder is configured to receive soft data from the second decoder. The second and third decoders are configured to iteratively execute a turbo decoding algorithm.

In another embodiment, the hard decision decoder selectively allows soft decision input. In the first iteration the first decoder is configured as a hard decision decoder and so does not us soft decision data. In a second iteration the first decoder is configured as a soft decision decoder and receives soft decision data from the second decoder.

A further aspect of the invention concerns a cryptographic method for reproducibly establishing a reliable data string. The method comprising
  establishing an initial data string depending on a physical, at least partially random, configuration of components,
  determining a first multiple of error correctable data words on the basis of the initial data string,
  decoding the first multiple of error correctable data words by hard decision decoding to obtain a second multiple of corrected and decoded data words,
  determining reliability information that is indicative of a reliability of said decoding of the first multiple of error correctable data words,
  arranging the second multiple of corrected and decoded data words to obtain at least one further correctable data word, and
  decoding the at least one further correctable data word by soft decision decoding using the reliability information to obtain to obtain at least one further corrected and decoded data word, the reliable data string being obtained from the at least one further corrected and decoded data word.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

A cryptographic system for reproducibly establishing a reliable data string, such as a cryptographic key, from a noisy physically unclonable function (PUF) is provided. The system comprises a hard decision decoder to decode a first multiple of error correctable data words to obtain a second multiple of corrected and decoded data words and a reliability information extractor to determine reliability information, e.g. soft decision information, that is indicative of a reliability of corrected and decoded data words. The system further comprises a soft decision decoder configured to use the reliability information to decode at least one further correctable data word. Error correcting a PUF using reliability information decreases the false rejection rate.

BRIEF DESCRIPTION OF THE DRAWINGS

The invention is explained in further detail by way of example and with reference to the accompanying drawings, wherein.

Throughout the Figures, similar or corresponding features are indicated by same reference numerals.

LIST OF REFERENCE NUMERALS

Figure 1A:
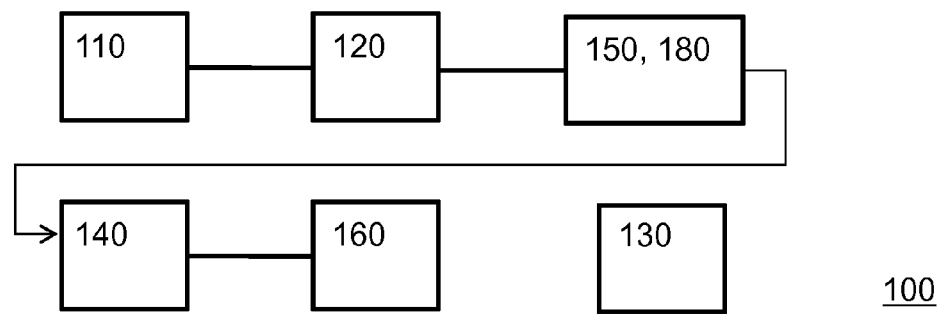
FIG. 1a is a block diagram illustrating a cryptographic system.

100 a system for reproducibly establishing a reliable data string
110 a physical unclonable function 115 an initial data string
120 a normalizer
125 a first multiple of error correctable data words
122 a first error correctable data word
130 a memory
140, 140a, a data arranger
140b
145 a further correctable data word
150 a hard decision decoder
152 a first decoded data word combined with reliability information
154 a first decoded data word
155 a second multiple of corrected and decoded data words
156 a reliability value
160, 160a, a soft decision decoder
160b
162 a further correctable data word including reliability information
164 a further correctable data word
165 a further corrected and decoded data word
166 reliability information
172 an encoder
180 a reliability information extractor
182 a distance determiner
184 a reliability value calculator
185 reliability information
192 a further corrected and decoded data word
212, 214, first correctable strings
216, 218
222, 224, first decoders
226, 228
232, 234, first data strings
236, 238
240 an interleaver
252, 254, second correctable strings
256
262, 264, second decoders
266
272, 274, second data strings
276
600 a smart card
610 an integrated circuit
605 a card
620 a processing unit
622 a memory
624 a physical unclonable function
626 a soft decision decoder
630 a bus
640 a smart card
700 a flowchart
710 reading PUF
720 obtaining first correctable code words from PUF data
730 decoding first correctable code words using first error correctable code
740 obtain first reliability values of first correctable code words
750 obtain second correctable codeword from decoded first correctable code words
760 decode second correctable code words using first reliability values and second error correctable code
770 obtaining reliable data string from decoded second correctable code words

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

The invention is based on the insight that soft-decision information may be derived from the output of any error correcting decoder and used to correct errors in a next error correcting decoder. A reliability value may be computed, e.g., based on the difference between the error corrected output codeword and the noisy input codeword. When the error corrected output codeword is decoded into its k information bits, all the information bits are associated with the reliability value.

Figure 1B:
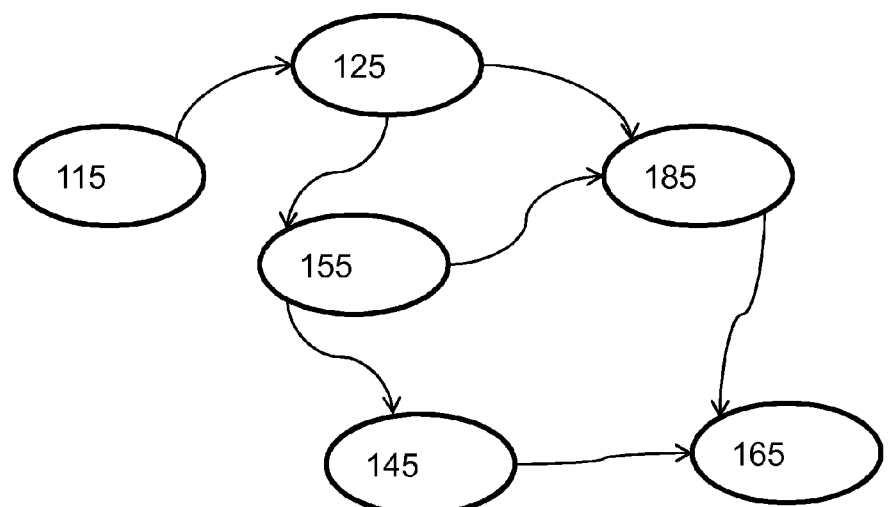
FIG. 1b is a block diagram illustrating data used in the cryptographic system.

FIG. 1a illustrates a system 100 for reproducibly establishing a reliable data string. System 100 uses soft decision information to improve error correction. FIG. 1b illustrates data used in system 100.

System 100 comprises a physical unclonable function 110. PUF 110 is configured for establishing an initial data string 115 depending at least in part upon partially random physical characteristics of the physically unclonable function.

PUF 110 may be any known physical unclonable function. Even though system 100 needs soft decision information, PUF 110 may only give hard quantified data. Typically, the output of PUF 110 is obtained by internally comparing measurements of physical phenomena with a threshold. In that case, only the information whether the measurements where above or below the threshold need be outputted by PUF 110. Typically, one has no access to the internal measurements in the PUF.

PUF 110 may be a volatile memory, which has the property that its power-up content depends on manufacture variations. The start-up values are then used as initial data string 115. The differences between two start-up values of two different instantiations of PUF 110 having the same design, are larger than between the values obtained from two different start-up of the same PUF 110. For example, PUF 110 may comprise an SRAM whereby the initial data string 115 is the content of the SRAM after power-up.

System 100 further comprises a normalizer 120. Normalizer 120 obtains the initial data string 115 from PUF 110. A typical initial data string has no particular structure. Normalizer 120 determines a first multiple of error correctable data words 125 on the basis of the initial data string. Often normalizer 120 adds, say XORs, so-called helper data to the initial data string. The construction of helper data is further described below. As a result of normalizer 120, the initial data string is converted into error correctable data. The error correctable data is correctable, thus compensating for the difference between subsequently obtained initial data strings, provided the error rate is low enough.

System 100 comprises a memory 130. Memory 130 may contain multiple memories, both volatile and non-volatile. For example, non-volatile memory may contain helper data for use by normalizer 120. Other parts of memory 130 may be volatile and used to store the first multiple of error correctable data words. Instead of shared volatile memory, another interface may used, e.g. a bus or a pipeline.

System 100 comprises a hard decision decoder 150 configured to decode the first multiple of error correctable data words 125 to obtain a second multiple of corrected and decoded data words 155. Hard decision decoder 150 works on the basis of an error correcting algorithm that corresponds to the error correcting code used to obtain the helper data. Advantageously, hard decision decoder 150 is a low code rate code such as a repetition code. The error correcting code used by hard decision decoder 150 is indicated with C1. For example, C1 is a repetition code of length 23. This code is indicated as an [n1,k1,d1]=[23,1,23] code, i.e. a code in which code data words have length n1, dimension k1, and minimum distance d1. Typically, hard decision decoder 150 decodes the first multiple one by one to obtain the second multiple.

System 100 comprises a reliability information extractor 180 configured to determine reliability information 185 that is indicative of a reliability of said decoding of the first multiple of error correctable data words. Reliability information extractor 180 may be part of hard decision decoder 150 or a separate entity. In FIG. 1*a*, reliability information extractor 180 is not separately shown. FIG. 1*b* shows the reliability information 185 as dependent on noisy codewords in first multiple 125 and the decoded second multiple 155. This is possible using an encoder as explained below. Alternatively, reliability information 185 may be derived directly from first multiple 125 using corrected code words obtained in hard decision decoder 150.

Apart from the decoded and corrected data word that corresponds to an error correctable data word, there corresponds a corrected code word. Typically, reliability information extractor 180 obtains a reliability value for each corrected and decoded data word of the second multiple by comparing the corresponding data word of the first multiple with the corresponding corrected code word. For example, the reliability value obtained by reliability information extractor 180 is larger if the difference, e.g. distance, between the data word of the first multiple the corresponding corrected code word is smaller.

System 100 comprises a data arranger 140 configured to arrange the second multiple of corrected and decoded data words to obtain at least one further correctable data word 145. The combined data obtained in the second multiple has a lower error rate than the initial string and has reliability data. Thus this data is improved in two ways with respect to the initial data string. Data arranger 140 arranges the data into new error correctable data words, with respect to a new, possibly different code. There is no need for additional helper data at this stage. Data arranger 140 also keeps track of the reliability information. Reliability information assigned by reliability information extractor 180 to one data word of the second multiple is assigned by data arranger 140 to the part of the at least one further correctable data word obtained from that one data word.

System 100 comprises a soft decision decoder 160 configured to decode the at least one further correctable data word 145 using the reliability information 185 to obtain at least one further corrected and decoded data word 165. Many hard decision error correcting algorithms may be converted to soft decision variants. The error correcting code used by soft decision decoder 160 will be indicated as C2. For example, C2 may be a BCH code with parameters [n2,k2,d2]=[8,4,4]. Other possible soft decision codes suitable for use in system 100 are described below.

Finally, the reliable data string is obtained from the at least one further corrected and decoded data word 165. For example, the reliable data string is the at least one further corrected and decoded data word. For example, the reliable data string is obtained from the at least one further corrected and decoded data word 165 by a further error corrector, possibly a further soft decision decoder.

The code words of soft decision decoder 160 are likely of a different length as the data words decoded by hard decision decoder 150. Conversion between these different lengths is at least done by data arranger 140. Data arranger 140 could simply concatenate the second multiple, and partition the resulting string into data words of the correct size for soft decision decoder 160.

The notation C(S) is used to indicate the encoding of a value S with an error correcting code. When two consecutive error correcting codes are used, the encoding of a value S can be written as follows: C(S)=C1(C2(S)) This notation indicates that the value S is first encoded with error correcting code C2 and that the resulting codeword is encoded with an error correcting code C1. When the value C(S) is decoded, first the error decoding of code C1 has to be done, followed by the error decoding of code C2. Errors that cannot be corrected by C1, may still be correctable by code C2. In the case of system 100, C1 denotes the code used by the hard decision decoder 150, C2 denotes the code used by soft decision decoder 160.

Operation of system 100 has two phases. First an enrollment phase in which helper data is obtained, next a usage phase in which the helper data is used to obtain the reliable data string. Typically, for a given system 100 the enrollment phase is done only once whereas the usage phase may be done multiple times.

In the enrollment phase helper data is obtained (see also WO2004066296A1), which may be stored in some external or internal memory. Helper data contains information that can be used to correct errors in the PUF response, i.e. the initial data string, and possibly information required to correctly process the PUF response signals. Furthermore the helper data may contain information about the choice of a compression function (e.g. a hash function) which is used to compress error corrected data and/or retrieve a final cryptographic key.

A well known construction, the code-offset method, works as follows. During the enrolment phase PUF 110 is challenged and the response X is measured to obtain initial data string 110. For simplicity of explanation we assume here that X is a binary bit string. (In practice the actual PUF response R might first need some processing in order to derive a bit string X from R, possibly using some kind of processing helper data W3). A secret bit string S is randomly chosen and encoded with an error correcting code resulting in a codeword C(S). Helper data values are generated as follows:

W1:=C(S)⊕X

W2=a randomly chosen index in a family of compression or hash functions $H_i( )$ W3=any additional signal processing helper data (optional, depending on the type of PUF that is used).

The helper data comprises W1, W2 and W3 and may be stored locally, say in memory 130, or externally for later use. W2 and W3 are optional.

System 100 uses the helper data values W1 and W2 to reconstruct, e.g. a key, using the following steps:

1. Challenge PUF 110 and measure the response Y (optionally using helper data W3 as input to a signal processing block to derive bit string Y from PUF response R').
2. Compute reconstruction codeword C'(S):=W1⊕Y=C(S)⊕X⊕Y in normalizer 120.
3. Correct errors on codeword C'(S) as described herein, using a hard decision decoder 150 to obtain reliability data for use in a soft decision decoder 160. If the hamming distance between X and Y is smaller than or equal to the error correcting capability of the combined error correcting codes, errors can be corrected and the value C(S) is reconstructed.
4. Optionally, decode C(S) to obtain S
5. Optionally, Apply the hash function indicated with W2 on the value S to reconstruct key K:K:=$H_{W2}(S)$ Use of W2 and W3 is optional. There are other ways of creating and using helper data (e.g. appending redundant information).

Alternatively C(S) is used in step 4 to reconstruct the original PUF data, say SRAM startup data X, by XORing C(S) with the helper data W1; in that case the key in step 5 may be computed as K:=$H_{W2}$(X).

In order to prevent an attacker from manipulating the helper data (W1, W2 or W3), a check value can be computed using a cryptographic one-way hash function: V:=H(S,W1, W2,W3) or V:=H(K,W1,W2,W3). After the key or S has been reconstructed it can be computed whether the used helper data values were correct by hashing them together with the reconstructed value S or K and comparing the result to the stored value V.

Encoding secret bit string S with an error correcting code uses the concatenated code C: C(S)=C1 (C2(S)). That is first S is encoded with the error correcting code of the soft decision decoder, then re-arranged according to the inverse of data arranger 140 and finally, encoded with the error correcting code of the hard decision decoder. If more decoders are used, then the corresponding encoders are applied in the reverse order in which they are used during encoding.

Some codes allow to directly obtain a random code word. In that case the intermediate step of generating and encoding a secret bit string S can be skipped, and instead a random code word C(S) may directly be chosen.

After the enrollment phase, during the use phase, system 100 is operated as follows. An initial data string 115 is established by PUF 110. If PUF 110 is single-challenge, this may simply be done by powering system 100. The normalizer 120 applies the helper data to the initial data string and the first multiple of error correctable data words 125 is obtained. The first multiple is error-corrected by hard decision decoder 150 in so far as possible (some words may be incorrectly decoded because of too many errors) and the second multiple 155 is obtained. Reliability information 185 is obtained by reliability information extractor 180 that is indicative of a reliability of said decoding of the first multiple of error correctable data words. Preferably, reliability information extractor 180 establishes a reliability value for each one of the data words in the second multiple. If C1 is repetition code reliability information is obtained for each bit in the second multiple. Finally, at least one further correctable data word 145 obtained from the second multiple is decoded by soft decision decoder 160 using the reliability information 185 to obtain to obtain at least one further corrected and decoded data word 165.

System 100 may comprise a key establisher for establishing a cryptographic key by applying a key derivation algorithm to the reliable data string (not shown). For example, the key establisher may hash the reliable bit string, possibly with a salt. The salt is a data item and may be used to create multiple keys from the same input. For example the salt may be a random value, or a nonce. The salt is preferably stored in non-volatile memory, e.g., on the key establisher.

Figure 2A:
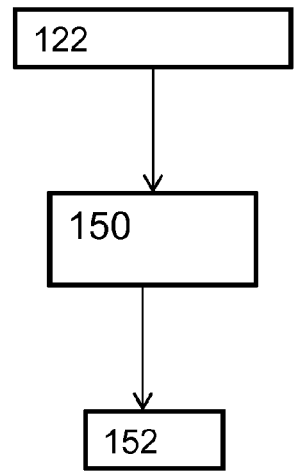
FIG. 2a is a block diagram illustrating a hard decision decoder.

FIG. 2a illustrates an embodiment hard decision decoder 150 with an integrated reliability information extractor 180. Hard decision decoder 150 is configured to receive error correctable data words, such as first error correctable data word 122. The error correctable data words are subjected to an error correcting algorithm to produce decoded data word combined with reliability information, such as data word 152. Hard decision decoder 150 is applied sequentially to all data words in the first multiple.

Figure 2B:
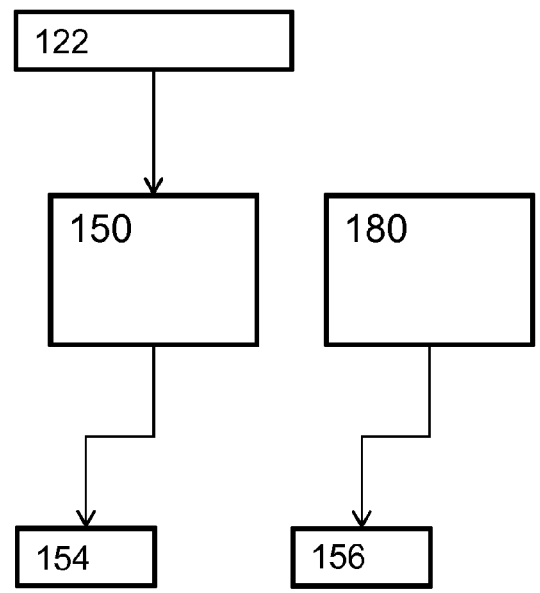
FIGS. 2b, 2c and 2d are block diagrams illustrating a hard decision decoder in combination with a reliability information extractor.

FIG. 2b shows a separate reliability information extractor 180. In this case hard decision decoder 150 may be a regular hard decision decoder that does not produce reliability information, only corrected and decoded data words, such as first decoded data word 154. Hard decision decoder 150 cooperates with reliability information extractor 180 to produce a reliability value corresponding to the decoding. In the case shown, a first reliability value 156 is indicating the reliability of decode word 154, i.e., of the decoding of first correctable data word 122. Hard decision decoder 150 is applied to multiple error correctable data words in the first multiple while reliability information extractor 180 is used to obtain multiple corresponding reliability values.

Figure 2C:
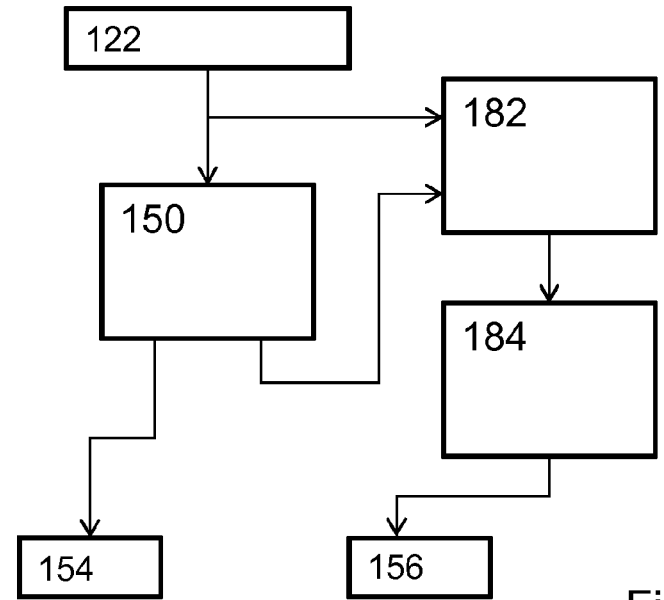
Figure 2D:
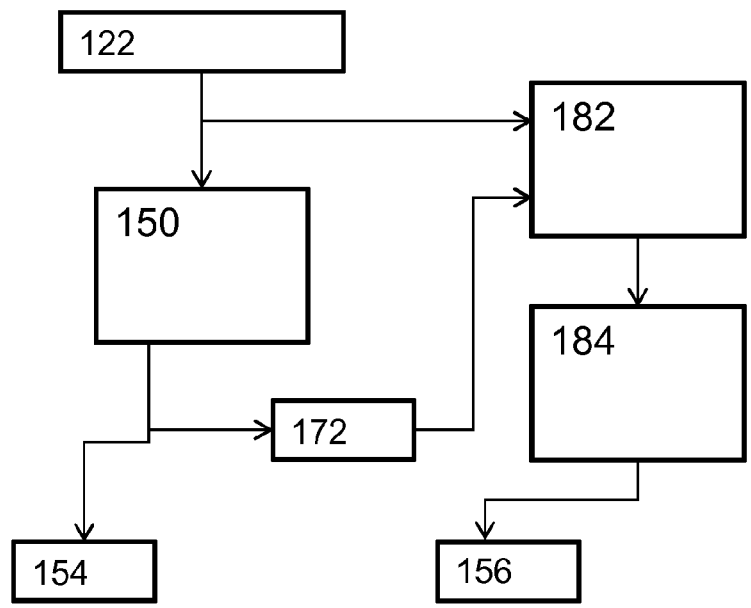

FIGS. 2c and 2d illustrate two ways in which reliability information extractor 180 may be combined with hard decision decoder 150.

FIG. 2c shows, as an example, decoding of the first error correctable data word 122 of the first multiple; the same applies to the other words of the first multiple. First correctable data word 122 is received by hard decision decoder 150 which converts first correctable data word 122 to a code words, typically to the nearest code words, using a error correcting algorithm, say the nearest code word algorithm, possibly implemented using list decoding. The code word is then decoded to obtain a decoded data word. In case of first correctable data word 122, first decoded data word 154 is obtained. Decoding a codeword comprises removing redundant information. The length of the codeword (e.g. number of bits) reduces from 'n' (the code word length) to 'k' (the code dimension). FIG. 2c further shows a distance determiner 182. Distance determiner 182 is configured to determine the distance between an error correctable data word and the code word obtained by the decoder. Distance determiner 182 is functionally connected to hard decision decoder 150 to obtain the code word, distance determiner 182 also receives the uncorrected data word first correctable data word 122. Distance determiner 182 may for example compute the hamming distance between uncorrected data word and corrected (e.g. nearest) code word. Other options for distance determiner 182 are possible and noted herein.

FIG. 2c further shows a reliability value calculator 184 configured to receive the distance from distance determiner 182.

The distance obtained by distance determiner 182 is converted to a reliability value 156 by reliability value calculator 184. For example, reliability value calculator 184 may linearly scale the distance obtained by distance determiner 182, in the desired reliability scale. Preferably, high distance corresponds to low reliability. Other options for distance determiner 182 are possible and noted herein.

As an example of an embodiment using based on FIG. 2c, consider code words from a BCH code with parameters (n,k, d)=(15,5,7). The error correcting capability of this code is t=floor((d−1)/2)=3 bits.

Suppose a first noisy codeword 122 that needs to be corrected is as follows: C1'=[0 1 1 1 0 1 0 0 0 1 1 0 1 0 1]. After error correction we obtain C1=[0 1 1 0 0 1 0 0 0 1 1 1 1 0 1]. A reliability value 156='c' can be computed based on the number of errors that have been corrected. For example, reliability value calculator 184 may compute the reliability value as computed as c=1−(a/t) where a is the number of corrected errors and t is the error correcting capability of the code used in hard decision decoder 150. In this case the computed reliability value is: c=1−2/3=1/3. [For non-perfect codes the reliability value could be computed as c=1−(a/(t+1)) such that there is a special reliability value (a=t+1) reserved for code words that could not be corrected] Here a high value of c indicates a high reliability, may also use an inverse scale wherein a low value of c indicates a high reliability.

In order to combine the reliability value with the output bits after decoding the codeword, the following method can be applied. First the decoded output bits are transformed into a sign value: a zero bit is coded as −1, a one bit is coded as +1. Then the sign value is multiplied with the reliability value. Hence in this example the soft-output values become: $S1=[-\frac{1}{3}\ +\frac{1}{3}\ +\frac{1}{3}\ -\frac{1}{3}\ -\frac{1}{3}]$. Note that this is basically still a representation of the bit string [0 1 1 0 0] in which all the bits have reliability value $\frac{1}{3}$. Hence, the sign of the values corresponds to the bit values and the absolute value corresponds to the reliability. So one always has the option of recording decoded data words and reliability separate or combined in a single string.

By way of further example, a second decoded codeword [1 1 0 0 1] may have been decoded without correcting any errors resulting in soft information output string $S2=[+1\ +1\ -1\ -1\ +1]$, and a third decoded codeword [0 1 1 0 1] may have been decoded with for example 1 corrected error resulting in a soft information output string $S3=[-\frac{2}{3}\ +\frac{2}{3}\ +\frac{2}{3}\ -\frac{2}{3}\ +\frac{2}{3}]$. Concatenating these output values by data arranger 140 results in the combined soft-information string:

$$S=[-\tfrac{1}{3}\ +\tfrac{1}{3}\ +\tfrac{1}{3}\ -\tfrac{1}{3}\ -\tfrac{1}{3}\ +1\ +1\ -1\ -1\ +1\ -\tfrac{2}{3}\ +\tfrac{2}{3}\ +\tfrac{2}{3}\ -\tfrac{2}{3}\ +\tfrac{2}{3}]$$

A soft-information string, or reliability information string, has a single reliability value for each bit of the second multiple. If a reliability value corresponds to a data words having multiple bits, the reliability value is assigned to each one of the multiple bits. Note that in the example above, decoded bits and reliability values are combined in a single string. This is convenient but not strictly necessary.

S is in itself a codeword of another error correcting code with included soft-decision information. This codeword may be used as the at least one further correctable data word in soft decision decoder 160. Soft decision decoder 160, i.e. the second error correction decoder can use this soft-decision information to compute the most likely codeword and decode that one. Alternatively, the values in S form soft-decision input values of various different second error correction code words. In other words the soft-information values are interleaved over multiple error correcting code words of the second soft-decision decoder.

Some error correction mechanisms allow to directly decode the input noisy code word without having the intermediate step of error correction. In that case the decoded bit string can be re-encoded in order to retrieve the error corrected codeword. This alternative is used in FIG. 2*d*.

FIG. 2*d* shows in addition to the elements shown in FIG. 2*c* an encoder 172. Hard decision decoder 150 is configured only to give the decoded and corrected data word, not the corresponding code word. This may occur, since some codes do not require the separate computation of the code words. If hard decision decoder 150 is implemented as a hardware error decoder, one similarly may not have access to internal intermediate steps such as code words.

Encoder 172 is configured to re-encode the first decoded data word 154. The result is a codeword that corresponds to first correctable data word 122. Note that multiple different noisy code words correspond to the same corrected codeword. Distance determiner 182 thus receives a noisy code word from normalizer 120 and a corrected codeword from encoder 172. Distance determiner has thus the same inputs as in FIG. 2*c* and computes the distance as in FIG. 2*c*. Also reliability value calculator 184 will work as in FIG. 2*c*.

An alternative way to combine a reliability value (c) with an output bit (d) after decoding is to combine c and d into a single value between 0 and 1, such that bits of low reliability are close to ½ and bits of high reliability are close to 0 or 1 depending on the corresponding data bit. For example if d is 0 or 1, and c is between 0 and 1, the combined value may be taken as $d+(1-2d)*(1-c)/2$, possibly quantified in a predetermined number of bits. Here c=0 low indicates low reliability.

Computing a reliability value on the basis of distance can be done in various ways. Suppose the input of a repetition decoder for code C1 has length n1. Assuming that there is no noise, the Hamming Weight (HW) of this input would be either 0 or n1. In a real PUF scheme noise will be present and therefore the HW of the input can have any value between 0 and n1. This HW contains information, which is not utilized in earlier methods. The information is related to the probability of correct decoding. When HW of the input is close to either 0 or n1, the probability of correct decoding of this input is higher than when HW is close to (n1)/2.

For example, if n1=23. The decoded output of decoder 150 will be 1 when 12≤HW≤23. The probability that the decoder is correct is much larger when HW=23 than when HW=12, but this information is lost when using say majority voting for decoding which does not extract reliability information. Distance determiner 182 and reliability value calculator 184 quantizes the hamming weight of a sequence of input bits into a decimal value such that soft-decision information is incorporated.

For example, a 2-bit quantization (into 4 levels) for n1=23, the decoder has four possible outputs: 0, ⅓, ⅔ and 1, depending on the hamming weight (HW) of the 23 input bits.
Output=0→if: 0≤HW≤threshold
Output=⅓→if: threshold+1≤HW≤11
Output=⅔→if: 12≤HW≤23−(threshold+1)
Output=1→if: 23−threshold≤HW≤23
The value "threshold" can be varied in order to obtain the construction that works best in combination with the second decoder for C2. An example value for the threshold is 5.

In case so-called perfect error correcting codes are used, the most straightforward implementation is to assign to all of the bits after decoding of a specific codeword the same reliability value, possibly using distance determiner 182. This is however not necessary. For example, in case a non-perfect error correcting code is used, different reliability values may be assigned to different output bits. For example, if the noisy codeword is at equal distance from more than 1 code words, it can be verified which of the bits in these code words are the same and which of the bits are different. Bits that are the same in more code words than a threshold will get a higher reliability value.

In general, reliability value calculator 184 may apply a predetermined formula based to the difference, e.g. distance, between the corrected codeword and codeword obtained from the PUF.

Figure 3A:
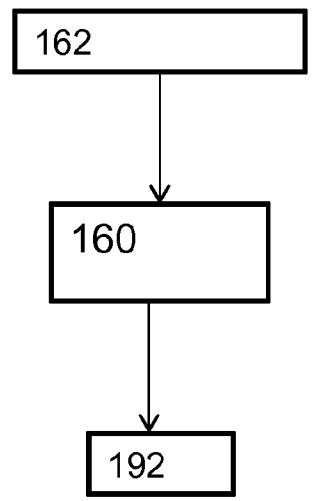
FIGS. 3a and 3b are block diagrams illustrating a soft decision decoder.
Figure 3B:
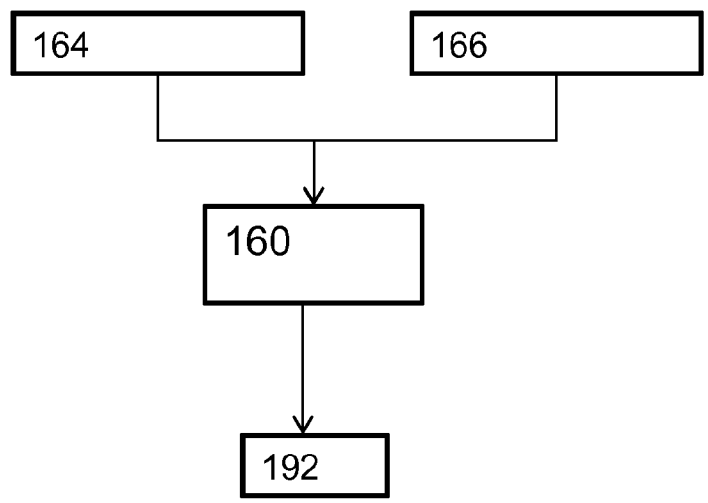

FIGS. 3*a* and 3*b* show two possible embodiments of soft decision decoder 160. FIG. 3*a* shows a soft decision decoder 160 receiving a further correctable data word including reliability information 162. FIG. 3*b* shows a soft decision decoder 160 receiving a further correctable data word 164 and separate reliability information 166.

There are several ways to implement a soft decision decoder. One option is to use a special algorithm, configured to take soft decision information into account. For example, the following paper discloses a suitable soft decision decoder 'An Efficient Algorithm for Soft-Decision Decoding of the (24, 12) Extended Golay Code', Hackett, C. IEEE Transactions on Communications, June 1981, Volume: 29 Issue:6, page(s): 909-911.

A further method (referred to as method A) is to look at each possible codeword and use Euclidian distance to determine which codeword is most likely in the sense that it is the closest. This method is also called nearest-neighbor decoding. It can be implemented efficiently with the use of look-up tables. This implementation gets less efficient when the error-correcting code has a higher number of code words.

For example, soft decision decoder 160 comprises a code word table containing all code words of the error correcting code used by soft decision decoder 160. For each code word in the code word table a distance is computed between the code word and the at least one further correctable data word. Elements, e.g. bits, of the further correctable data word having a low reliability value are given a lower weight in the distance. The distance may be computed by computing the Euclidean distance between the at least one further correctable data word wherein reliability information is incorporated by scaling the elements towards ½ and the code word table.

Another method (method B) is to use the minimum distance between code words of the error-correcting codes. The most likely codeword is within this distance of the quantization values and can be found by applying all error values within this minimum distance. This implementation gets less efficient when the error-correcting code has a high maximum distance between code words, when the code words have many bits and when a higher number of quantization bits are used. However it is not limited in efficiency by the number of code words.

Specific properties of specific error correcting codes can lead to more efficient implementations.

We give an example of a maximum likelihood decoder according to method A. More specifically we take as an example a maximum likelihood Reed-Muller (8, 4, 4) decoder with parameters n2=8, k2=4, d2=4. All possible 2'(2=16 code words are listed in the following code word table.

Code word table: (00000000, 01010101, 00110011, 01100110, 00001111, 01011010, 00111100, 01101001, 10010110, 11000011, 10100101, 11110000, 10011001, 11001100, 10101010, 11111111)

All possible Euclidean distances between a codeword bit and an input quantization value are listed in the table below. Here data and reliability value are combined in a single value between 0 and 1, such that bits of low reliability are close to ½ and bits of high reliability are close to 0 or 1 depending on the corresponding data bit. Note that it may happen that the entire word is falsely decoded, and that some bits are flipped from 0 or 1 or vice versa. In that case the decoded code word is wrong and likely at some distance from the correct codeword. The bits will likely get a low reliability value.

Distance Look-Up with 2 Bit Quantization:

| Quantization value (*) | Code word bit | Distance $\|a-b\|^2$ |
| --- | --- | --- |
| 0 | (00) | 0 | 0 |
| 1/3 | (01) | 0 | 1/9 |
| 2/3 | (10) | 0 | 4/9 |
| 1 | (11) | 0 | 1 |
| 0 | (00) | 1 | 1 |
| 1/3 | (01) | 1 | 4/9 |
| 2/3 | (10) | 1 | 1/9 |
| 1 | (11) | 1 | 0 |

*Note that the bits between brackets form a digital representation of the decimal quantization value. This representation is used for an efficient information transfer between the first and second decoder.

The Euclidian distance is computed by taking the square root of sum of bit-distances. The codeword with the smallest Euclidian distance is the most likely one. The square root does not have to be implemented for this comparison ($a<b \rightarrow \sqrt{a}<\sqrt{b}$, for a, b≥0).

Quantization values "00, 01, 11, 10, 01, 00, 11, 10" gives the following squared distances for each one of the words in the code word table:

$$00000000: 0 + \frac{1}{9} + 1 + \frac{4}{9} + \frac{1}{9} + 0 + 1 + \frac{4}{9} = 3\frac{1}{9}$$

$$01010101: 0 + \frac{4}{9} + 1 + \frac{1}{9} + \frac{1}{9} + 1 + 1 + \frac{1}{9} = 3\frac{7}{9}$$

$$00110011: 0 + \frac{1}{9} + 0 + \frac{1}{9} + \frac{1}{9} + 0 + 0 + \frac{1}{9} = \frac{4}{9}$$

$$01100110: 0 + \frac{4}{9} + 0 + \frac{4}{9} + \frac{1}{9} + 1 + 0 + \frac{4}{9} = 2\frac{4}{9}$$

...

The most likely codeword therefore is "00110011".

Note that the 2-bit quantization is used here as an example. In order to get even more soft-decision information from the input, quantization by the hamming weight quantizer (first decoder) can be increased to more than 2 bits. In case of this example the maximum number of output values is 24 (0 to 23), which can be expressed in 5 bits (not using all 32 possible values of the 5 bits output).

Figure 4:
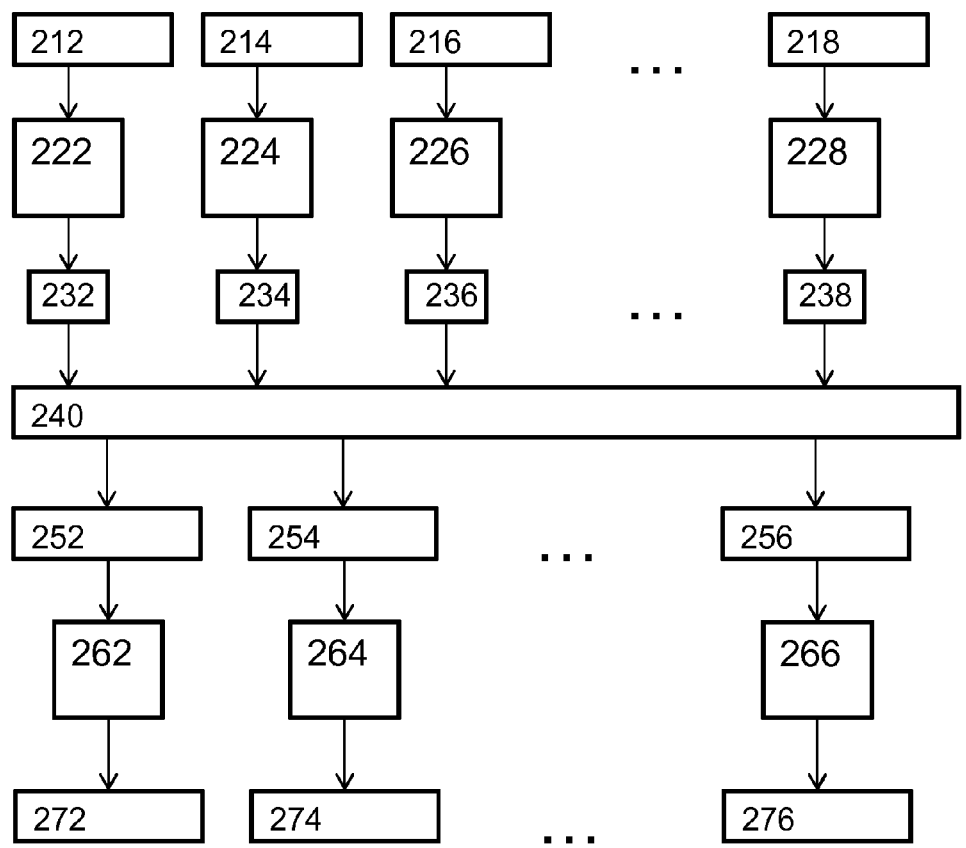
FIG. 4 is a block diagram illustrating a cryptographic system

FIG. 4 is a further illustration of a cryptographic system 200.

A first multiple of strings is received from PUF 110; shown are first correctable strings 212, 214, 216, 218 of the first multiple. system 200 comprises first decoders 222, 224, 226, 228. One has the option of replacing the first decoders 222-228 by a single decoder, say 222, and decode the data words of the first multiple in turn. The first decoders correct and decode the first multiple to obtain a second multiple of first data strings, shown are first data strings 232, 234, 236, 238. Also reliability information is obtained of each data string of the second multiple (not separately shown).

System 200 comprises an interleaver 240 for interleaving the second multiple into at least one further correctable data string; shown are the second correctable strings 252, 254, 256. Each one of the second correctable strings 252, 254, 25 comprises part of at least two data words of the second multiple. Preferably, each bit in one second correctable strings is obtained from a different word of the first multiple.

System 200 further comprises second decoders 262, 264, 266. The second decoders make use of reliability information to obtain second data strings 272, 274, 276. Again a single second decoder could also be used. The second data strings may be combined to give the reliable bit string.

In system 100 and system 200 a reliability value is computed for all of the output bits after decoding. This reliability value is the same for all the output bits of the same decoded codeword. For example if the hard decision decoder 150 or decoders 222 to 228 use a Reed-Muller [8,4,4] code, they will each take an 8 bit data bit as input and produce an 4 bit output. 8 of such corrected and decoded data words can be interleaved to obtain 4 data words of 8 bits. These can again be decoded by a Reed-Muller [8,4,4] code, but this time utilizing reliability values. The interleaving can be done, and this is preferable, such that each data word of the at least one further correctable data word is obtained from a different word in the second multiple.

The output strings 232, 234, 236 to 238 are the decoded results from as many different input code words and they will have different reliability values after applying the described method. The reliability values are assigned by interleaver 240 to the bits of data words 252 to 256.

Below a worked example is provided to illustrate the invention. We consider a situation with two codes both with and without using soft decision decoding.

First we consider a situation with two codes but without using soft decision decoding. For example, suppose that error correcting code C1 is a repetition code of length 23. This code is indicated as an [n1,k1,d1]=[23,1,23] code. Suppose that error correcting code C2 is a BCH code with parameters [n2,k2,d2]=[8,4,4]. Combining these codes means that a secret of k2=4 bits information can be encoded with error correcting code C2. The resulting codeword C2(S) is of size n2=8 bits. Encoding these bits with error correcting code C1 requires the application of this error correcting code 8 times, since only k1=1 information bit can be encoded per codeword of C1. The result is a combined codeword C1(C2(S)) of size n2*n1=184 bits. In the key extractor construction a PUF response X of 184 bits would be required in this case.

Decoding is performed by the repetition decoder using majority voting. This means that the output of the repetition decoder corresponds to the bit that is present the most in the input of the decoder. In case of repetition length 23, one of the two possible bit values (0 or 1) is present at least 12 times at the decoder input. This value will be selected as output bit of the decoder and will be part of the input of the second decoder.

The false rejection rate (FRR) is the probability that due to errors in the measured PUF response, the encoded secret S cannot be reconstructed. The FRR of the construction above can be calculated as follows (assuming a worst-case error probability $\epsilon$ of 25% in the PUF response for each individual bit at the input of the repetition decoder):

$$P(\text{error of repetition decoder}) = Prep = \sum_{i=\lceil (n1)/2 \rceil}^{n1} \epsilon^i (1-\epsilon)^{(n1-i)} \frac{n1!}{i!(n1-i)!} =$$

$$\sum_{i=12}^{23} 0.25^i 0.75^{23-i} \frac{23!}{i!(23-i)!} \approx 0.0046$$

$$P(\text{error of 2nd decoder}) = FRR =$$

$$\sum_{i=\lfloor (d2-1)/2 \rfloor + 1}^{n2} Prep^i (1-Prep)^{(n2-i)} \frac{n2!}{i!(n2-i)!} =$$

$$\sum_{i=2}^{8} 0.0046^i 0.9954^{8-i} \frac{8!}{i!(8-i)!} \approx 5.93 \cdot 10^{-4}$$

Note that for simplicity of explanation we have used a single error correcting codeword C2 in the example above. In this case only 4 key bits are encoded, which of course is not enough for a key in practical cryptographic applications. In order to encode more key bits the construction above can be repeated several times. Suppose for example that 128 key bits are required. In that case the construction above is repeated 32 times and hence 32 code words C2 are used in concatenation. The probability that there is an error in the reconstructed key is then computed as the probability that there is at least one of the 32 code words that contains errors, which equals 1 minus the probability that all of the 32 code words decode correctly. So the total false rejection rate becomes $$FRR_{Total} = 1 - P(\text{all 32 code words correct}) =$$

$$1 - \left( \sum_{i=0}^{\lfloor (d2-1)/2 \rfloor} Prep^i (1-Prep)^{(n2-i)} \frac{n2!}{i!(n2-i)!} \right)^{32} =$$

$$1 - \left( \sum_{i=0}^{1} 0.0046^i 0.9954^{8-i} \frac{8!}{i!(8-i)!} \right)^{32} \approx 1.88 \cdot 10^{-2}$$

In commercial applications failure rates or false rejection rates at least below $10^{-6}$ are required. This can be achieved by increasing the length n1 of the repetition decoder. For example, if we use a repetition 55 code with parameters [n1,k1,d1]=[55,1,55], we get the following values: Prep=$3.22 \cdot 10^{-5}$, $FRR_{total}$=$-9.27 \cdot 10^{-7}$. This solution then requires n1*32*n2=55*32*8=14080 PUF data bits (1.72 KB). Another way of decreasing $FRR_{total}$ is to use a different C2 that is able to correct more than a single error.

Second, using the information above the FRR of the new construction can be calculated for different codes with soft-decision decoding. Below an example can be found of this calculation for the codes used above.

As an example we assume 2-bit quantization, $\epsilon$=0.25 and threshold=6.

Due to the soft-decision decoder, it is not straightforward to simply calculate the FRR of the new scheme. Experiments were conducted using a simulated a PUF source with $\epsilon$=0.25. This way the FRR of the system can be determined using statistical analysis. The result is as follows:

FRR=(number of erroneous decodings)/(number of simulations)=$2.07 \cdot 10^{-5}$ $FRR_{Total}$=1−P(all 32 code words correct)=1−(1−FRR)$^{32}$=1−(1−2.07·$10^{-5}$)$^{32}$≈$6.63 \cdot 10^{-4}$ It is clear from the simulation results above that the FRR is significantly lower using the 2-bit quantized soft-decision construction than it was with the previous construction without soft-decision decoding. When using more than 2 bits for quantization, the FRR will decrease even further. This way it is possible to decrease the length of the repetition code to obtain the required FRR and therefore decreasing the amount of SRAM required.

Figure 5:
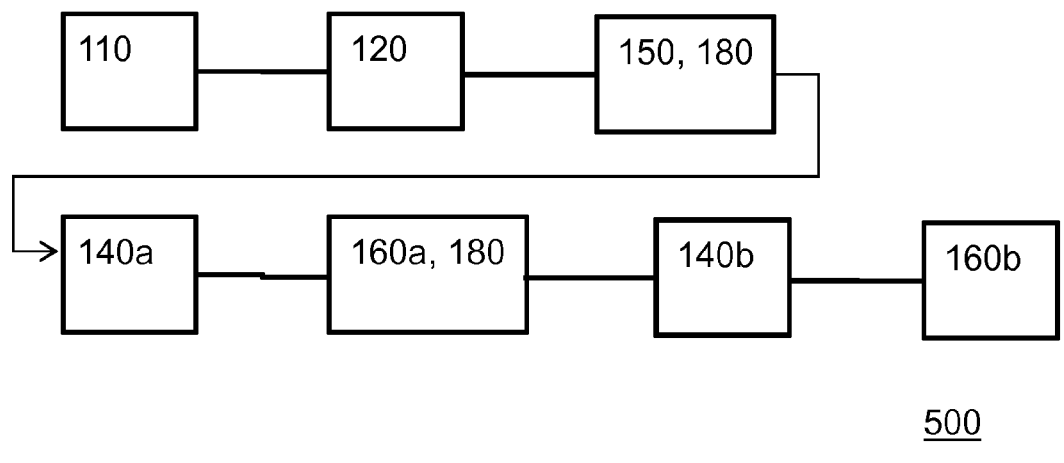
FIG. 5 is a block diagram illustrating a cryptographic system.

FIG. 5 illustrates in a block diagram illustrating a cryptographic system 500 having three decoders. FIG. 5 is based on FIG. 1, with an additional decoder.

FIG. 5 comprises PUF 110, normalizer 120, hard decision decoder 150. Hard decision decoder 150 produced decoded data words in a second multiple along with reliability information. System 500 has two soft decision decoders: soft decision decoder 160a and soft decision decoder 160b, and two data arrangers: data arranger 140a and data arranger 140b.

Soft decision decoder 160a compares the reconstructed code word with the input to obtain reliability information for use in soft decision decoder 160b. For example, the output code word may be compared to the input wherein reliability information has been incorporated. For example, the sign of the input codeword values indicates the bit values (minus indicates a 0 bit, plus indicates a 1 bit). The soft decision input values can still be compared to the error corrected codeword to count the number of corrected errors.

For example, let the reconstructed codeword be C'(S)=[−⅓ +1 +⅔ +⅔ −1 +1 −1 −1 −⅔ +⅔ +1 −1 +1 −1 +1] and the error corrected codeword be C(S)=[0 1 1 0 0 1 0 0 0 1 1 1 1 0 1]. If the sign values of C'(S) are taken to convert C'(S) into a bit string then we retrieve the string [0 1 1 1 0 1 0 0 0 1 1 0 1 0 1] and the computed difference is 2 bits as before.

An alternative way would be to take the input soft decision values into account when computing the amount of errors by first converting output C(S) to sign values sign(C(S))=[−1 +1 +1 −1 −1 +1 −1 −1 −1 +1 +1 +1 +1 −1 +1] and then compare the difference with the soft decision values in C'(S). Note that converting to sign values means assigning a value −1 to a 0-bit in the codeword and a value +1 to a 1-bit in the codeword. In this case the absolute summed difference ASD of the values in vector sign(C(S)) and the soft-decision values in vector C'(S) can be computed. This value adds up to ASD=Sum_i(abs (sign(C(S)_i−C'(S)_i)))=⅔+0+⅓+5/3+0+0+0+0+⅓+⅓+0+ 6/3+0+0+0=16/3. Note that in this case the reliability value will be computed differently, for example as c=1−(ASD/(nt)) where n is the codeword size.

For example, if the input of the second decoder is 0 0 0 ⅓ 0 0 0 0 it is more likely that the output of the decoder (which is the all zero vector) is correct than when the input is 0 0 0 ⅓ 0 0 ⅓ ⅔ (which is also decoded to the all zero vector). Based on this observation information could be provided to the third decoder.

Although, in many embodiments, each bit of the second multiple of corrected and decoded data words is used in one (exactly one, or at most one) further correctable data word this is not necessary. In a further embodiment, at least one of the second multiple of corrected and decoded data words is used in more than one further correctable data word. This has several advantages. For example, consider the situation wherein the hard decision decoder is implemented in hardware (e.g. in CMOS) and cannot be altered. If the turns out that the reliability of the PUF is better than expected the amount of data produced by the system may be increased by re-using output bits of the hard decision decoder for multiple correctable data words of the soft decoder. Preferably, bits that are used in multiple soft-decision words receive the same reliability value, but this is not strictly needed either. Some may be a better representation of the reliability than others.

Figure 6A:
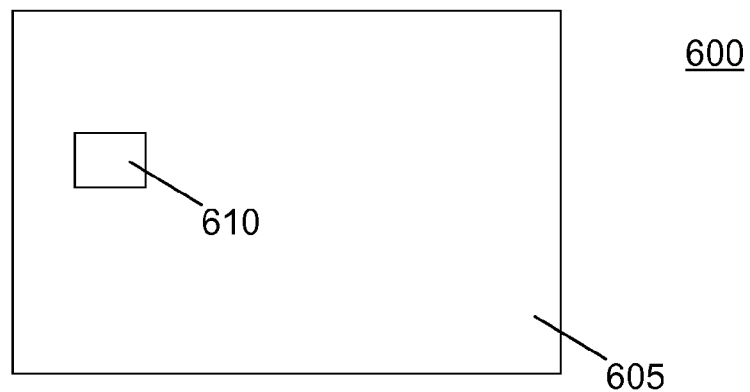
FIGS. 6a and 6b are block diagrams illustrating a smart card comprising cryptographic system.
Figure 6B:
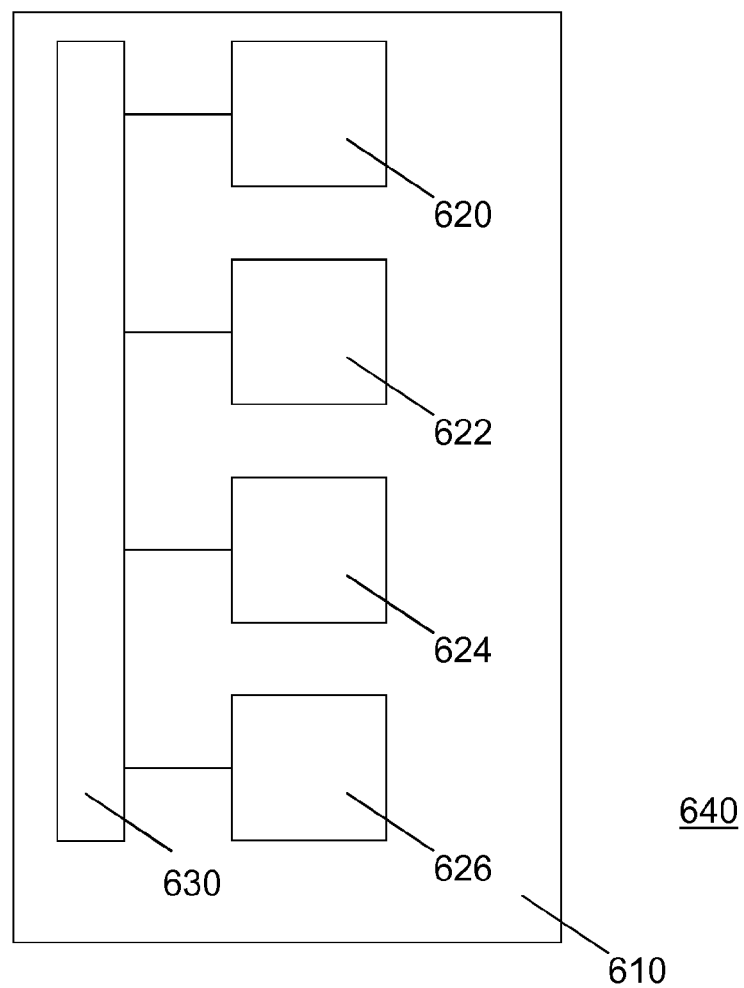

FIG. 6a shows in top-view a schematic representation of a smart card 600 according to the invention. The smart card comprises an integrated circuit 610 and a, typically plastic, card 605 supporting integrated circuit 610. The architecture of integrated circuit 610 is schematically shown in FIG. 6b. Circuit 610 comprises a processing unit 620, e.g. a CPU, for running computer program components to execute a method according to the invention and/or implement its modules or units. Circuit 610 comprises a memory 622 for storing programming code, data, cryptographic keys, helper data etc. Part of memory 622 may be read-only. Part of memory 622 may be high security memory, e.g., fuses for storing security related data, e.g., keys. Circuit 610 comprises a physical unclonable function 624. Physical unclonable function 624 may be combined with memory 622. Circuit 210 may comprise a soft decision decoder 626, e.g., a hardware implemented decoder. Circuit 610, memory 622, PUF 624 and decoder 626 may be connected to each other via a bus 630. The card may be arranged for contact and/or contact-less communication, using an antenna and/or connector pads respectively. The smart card may be used, e.g., in a set-top box to control access to content, in a mobile phone to control access to a telecommunication network, in a public transport system to control access to public transport, in a banking card to control access to a bank account, etc.

For example, memory 622 may comprise software for execution by processing unit 620. When the software is executed some of the functions of the modules of computing devices are performed. PUF 624 may comprise a volatile memory say SRAM.

One way to use smart card 640, is to read out PUF 622. Normalization, hard decision decoding, reliability information extraction and data arrangement is done in software by processor 620 running corresponding computer code stored in 622. Soft decision decoder 626 decodes a resulting further correctable data word(s). Decoder 626 may also be implemented in software.

Figure 7:
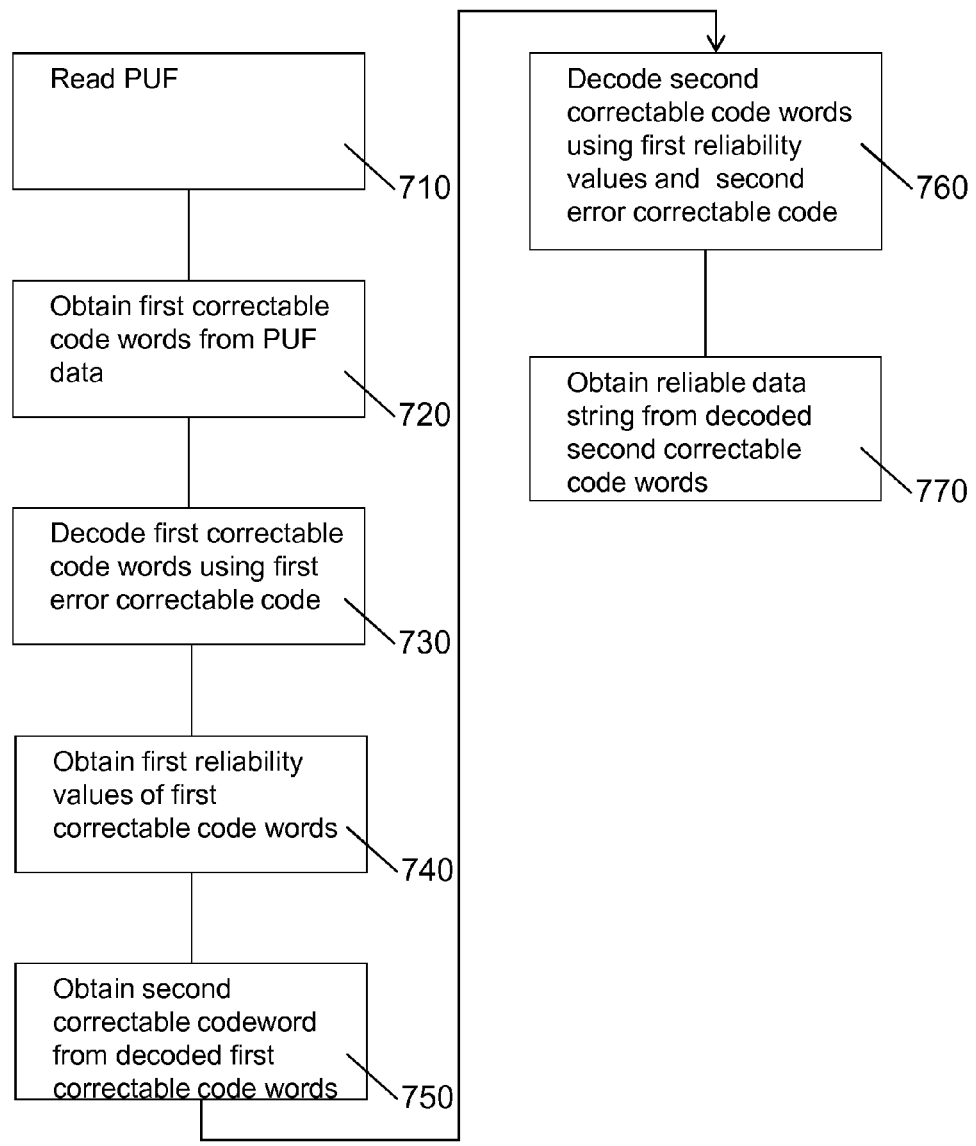
FIG. 7 is a flow chart illustrating a cryptographic method.

FIG. 7 illustrates as a flow chart a method 700 for reproducibly establishing a reliable data string from a noisy physically unclonable function. The following steps are shown: reading PUF 720; obtaining first correctable code words from PUF data 720; decoding first correctable code words using first error correctable code 730; obtain first reliability values of first correctable code words 740; obtain second correctable codeword from decoded first correctable code words 750; decode second correctable code words using first reliability values and second error correctable code 760; obtaining reliable data string from decoded second correctable code words 770.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 730 and 760 may be executed, at least partially, in parallel. Moreover, a given step may not have finished completely before a next step is started.

A method according to the invention may be executed using software, which comprises instructions for causing a processor system to perform method 700. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example, processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Furthermore, the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A cryptographic system for reproducibly establishing a reliable data string from a noisy physically unclonable function, the system comprising
   the physically unclonable function being configured for establishing an initial data string depending at least in part upon partially random physical characteristics of the physically unclonable function,
   a normalizer configured for determining a first multiple of error correctable data words on the basis of the initial data string,
   a hard decision decoder configured to decode the first multiple of error correctable data words to obtain a second multiple of corrected and decoded data words,
   a reliability information extractor configured to determine reliability information, that is indicative of a reliability of said decoding of the first multiple of error correctable data words,
   a data arranger configured to arrange the second multiple of corrected and decoded data words to obtain at least one further correctable data word, and
   a soft decision decoder configured to decode the at least one further correctable data word using the reliability information to obtain at least one further corrected and decoded data word, the reliable data string being obtained from the at least one further corrected and decoded data word.

2. The cryptographic system as in claim 1 having multiple power domains, wherein the physically unclonable function is based on the power-up content in a volatile memory, and wherein the volatile memory and the normalizer are in a same power domain.

3. The cryptographic system as in claim 1 comprising a key establisher for establishing a cryptographic key by applying a key derivation algorithm to the reliable data string.

4. The cryptographic system as in claim 1, wherein the reliability information comprises a reliability value that is indicative of the reliability of the decoding of a particular error correctable data word of the first multiple of error correctable data words into a particular corrected and decoded data word of the second multiple of corrected and decoded data words.

5. The cryptographic system as in claim 4, wherein the reliability information extractor comprises a distance determiner for determining a distance between a particular codeword corresponding to the particular corrected and decoded data word and the particular error correctable data word, the reliability value being derived from the distance.

6. The cryptographic system as in claim 1 wherein, the hard decision decoder is configured to decode each error correctable data word of the first multiple of error correctable data words to obtain a corresponding corrected and decoded data word of the second multiple, and wherein the reliability information extractor is configured to determine a reliability value for each one of the second multiple of corrected and decoded data words that is indicative of the reliability of the corresponding decoding of the error correctable data words of the first multiple.

7. The cryptographic system as in claim 1 wherein the data arranger is configured to arrange at least part of a first corrected and decoded data word of the second multiple and at least part of a second corrected and decoded data word of the second multiple into the same at least one further correctable data word.

8. The cryptographic system as in claim 1, wherein the data arranger is configured assign a different reliability value to different parts of the at least one further corrected and decoded data word.

9. The cryptographic system as in claim 8, wherein the at least one further correctable data word comprises multiple bits, each bit of the multiple bits being obtained by the data arranger from a corresponding corrected and decoded data word of the second multiple of corrected and decoded data words, the data arranger being configured to arrange reliability information in conjunction with the second multiple of corrected and decoded data words to obtain a reliability value for each bit of the multiple bits, a reliability value assigned to a bit of the multiple bits being the reliability value of a corresponding corrected and decoded data word.

10. The cryptographic system as in claim 1, wherein
   the hard decision decoder is configured for decoding a repetition code, and/or
   the hard decision decoder is configured for decoding a Hadamard code, and/or
   the hard decision decoder is configured as a list decoder.

11. The cryptographic system as in claim 1, wherein the at least partially random physical characteristics are observed during power-up from any one of an SRAM, a flip-flop, a bus-keeper, or a butter-fly PUF.

12. A smart card comprising the cryptographic system as in claim 1.

13. A cryptographic method for reproducibly establishing a reliable data string from a noisy physically unclonable function, the method comprising establishing an initial data string depending at least in part on partially random physical characteristics of the physically unclonable function, determining a first multiple of error correctable data words on the basis of the initial data string, decoding the first multiple of error correctable data words by hard decision decoding to obtain a second multiple of corrected and decoded data words, determining reliability information that is indicative of a reliability of said decoding of the first multiple of error correctable data words, arranging the second multiple of corrected and decoded data words to obtain at least one further correctable data word, and decoding the at least one further correctable data word by soft decision decoding using the reliability information to obtain to obtain at least one further corrected and decoded data word, the reliable data string being obtained from the at least one further corrected and decoded data word.

14. A non-transitory tangible computer readable storage medium comprising computer program code loadable in a computer, the computer program code being adapted to perform the following steps when loaded into a computer:

establishing an initial data string depending at least in part on partially random physical characteristics of a physically unclonable function, determining a first multiple of error correctable data words on the basis of the initial data string, decoding the first multiple of error correctable data words by hard decision decoding to obtain a second multiple of corrected and decoded data words, determining reliability information that is indicative of a reliability of said decoding of the first multiple of error correctable data words, arranging the second multiple of corrected and decoded data words to obtain at least one further correctable data word, and decoding the at least one further correctable data word by soft decision decoding using the reliability information to obtain to obtain at least one further corrected and decoded data word, the reliable data string being obtained from the at least one further corrected and decoded data word.

\* \* \* \* \*